United States Patent [19]

Porath-Furedi

[11] 4,402,614
[45] Sep. 6, 1983

[54] METHOD AND APPARATUS FOR MEASURING THE MOTILITY OF SPERM CELLS

[76] Inventor: Asher Porath-Furedi, 10 Kubovy St., Ramat Danya, Jerusalem, Israel

[21] Appl. No.: 197,194

[22] Filed: Oct. 15, 1980

[30] Foreign Application Priority Data

Oct. 25, 1979 [IL] Israel ................................ 58559

[51] Int. Cl.³ ..................... G01N 21/47; G01N 33/48
[52] U.S. Cl. ..................................... 356/446; 356/244
[58] Field of Search ............... 356/445, 446, 447, 448, 356/244

[56] References Cited

U.S. PATENT DOCUMENTS

| | | | |
|---|---|---|---|
| 3,592,526 | 7/1971 | Dreyer | 350/344 |
| 3,975,084 | 8/1976 | Block | 356/244 |
| 4,019,066 | 4/1977 | Lucas et al. | 356/445 |
| 4,022,521 | 5/1977 | Hall et al. | 356/244 |
| 4,176,953 | 12/1979 | Bartoov et al. | 356/73 |

*Primary Examiner*—Vincent P. McGraw
*Attorney, Agent, or Firm*—Benjamin J. Barish

[57] ABSTRACT

A method of measuring sperm motility comprises directing a beam of light at an angle at less than 30° into a thin film suspension of the sperm, and counting the number of reflections per unit time to provide an index of sperm motility. Apparatus for measuring sperm motility according to the above method comprises a holder including a pair of transparent plates beads for holding the sperm suspension in the form of a relatively thin film, means for directing the beam of light into the thin film suspension, an optical detector for detecting the reflection, and a counter for counting the number of reflections per unit time.

10 Claims, 2 Drawing Figures

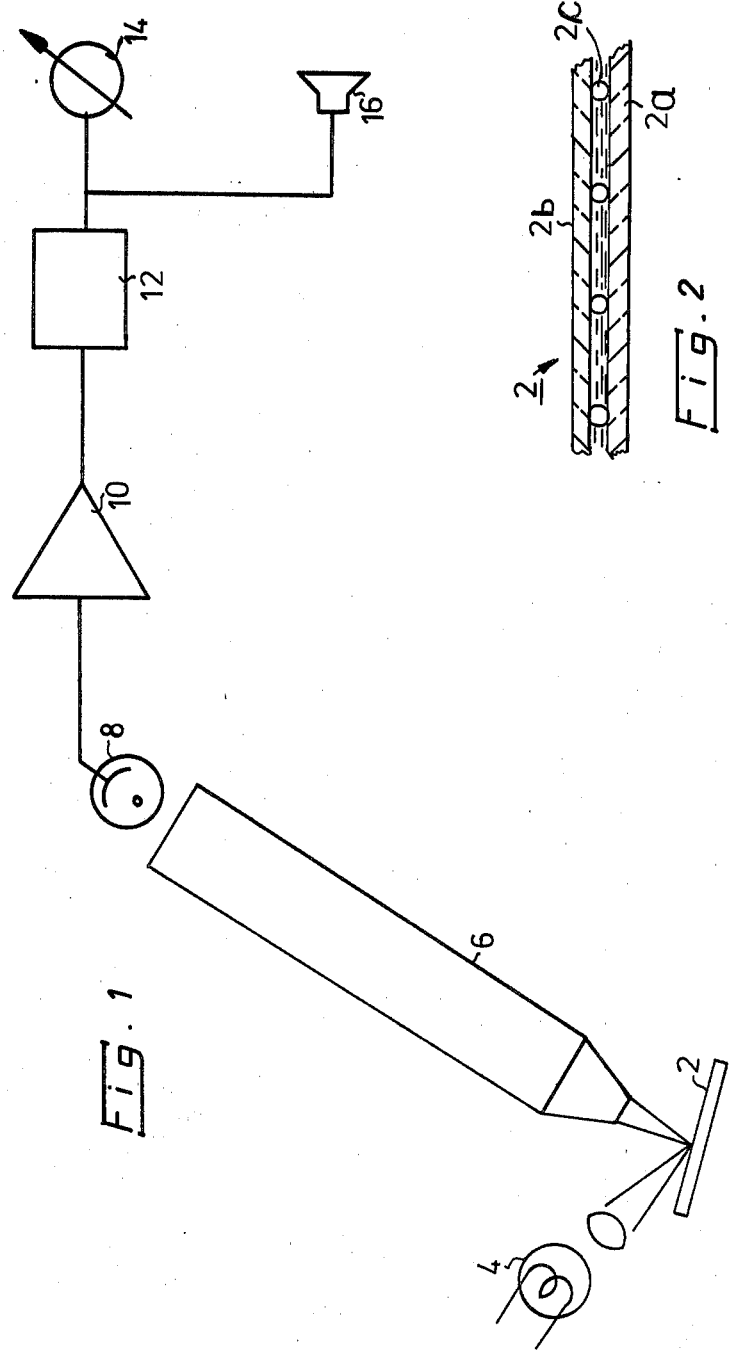

METHOD AND APPARATUS FOR MEASURING THE MOTILITY OF SPERM CELLS

BACKGROUND OF THE INVENTION

The present invention relates to a method and apparatus for measuring sperm motility.

Sperm motility, i.e., the spontaneous movement of sperm cells, is considered to be one of the most important criteria influencing the fertility of sperm cells. The determination of sperm motility is commercially important for evaluating the suitability of a specimen for artificial insemination of animals, for example.

A large number of techniques have been devised for measuring sperm motility. One known technique is based on the continuous photographic examination of the movement of individual sperm cells; another known technique is based on examining the specimen at several disrete time intervals, i.e., by multiple photographic exposures; and a further technique is based on the detection of light scattered from the specimen by the use of a laser, the scattered light being spread, according to the Doppler Effect, into frequencies giving a spectrum which depends on the sperm movement. Generally speaking, however, these known techniques produce inaccurate results, or introduce substantial delays before the results are available, or require expensive and complicated equipment or procedures.

An object of this invention is to provide a new method and apparatus for measuring the motility of sperm cells.

BRIEF SUMMARY OF THE INVENTION

According to a broad aspect of the present invention, there is provided a method of measuring sperm motility comprising: directing a beam of light into a suspension of the sperm; optically detecting reflections of the light from the sperm in suspension; and counting the number of reflections per unit time to provide an index of sperm motility with respect to the sperm in said suspension. The suspension is supported as a relatively thin film. The counting is done by a detector located on one side of the thin film, and the beam of light is directed into the thin film at an angle of less than 30° thereto from the same side as the detector.

The invention can thus be considered as being based on scintillation counting of light reflected by the sperm cells according to the "Tyndall Effect". The latter effect can be defined as the visible scattering of light along the path of a beam of light as it passes through a system containing discontinuities; in this case, the discontinuities are the sperm cells. The technique of the present invention is to be distinguished from the previously-mentioned light scattering technique, wherein the scattered light is spread, according to the Doppler Effect, into frequencies giving a spectrum which depends on the sperm movement. In the present invention, the reflections of the light scattered by the sperm cells are directly detected and are counted per unit time to provide the index of sperm motility.

Further, in the described embodiment the reflections of light from the sperm suspension are detected by an optical detector located at substantially 90° to the plane of said thin film.

According to another aspect of the invention, there is provided apparatus for measuring sperm motility comprising: a holder for a suspension of the sperm whose motility is to be measured; means for directing a beam of light into the suspension of the sperm in said holder; an optical detector for detecting reflections of the light from the sperm in said suspension; and counting means for counting the number of reflections per unit time to provide an index of sperm motility with respect to the sperm in said suspension. The holder is adapted to hold the sperm suspension in the form of a relatively thin film, and the light-directing means is disposed to direct the light at an angle of less than 30° to the surface of the thin film from the same side as the detector.

In the preferred embodiment described, the holder includes a pair of transparent plates separated by a plurality of small spacer beads, the sperm suspension being disposed in the spaces between said plastic beads.

Further features and advantages of the invention will be apparent from the description below.

BRIEF DESCRIPTION OF THE DRAWINGS

The invention is herein described, by way of example only, with reference to the accompanying drawings, wherein:

FIG. 1 diagrammatically illustrates one form of system for measuring sperm motility in accordance with the invention; and FIG. 2 illustrates a specimen holder that may be used in the system of FIG. 1.

DESCRIPTION OF A PREFERRED EMBODIMENT

With reference to the accompanying drawings, there is shown a specimen holder, generally designated 2, for holding a suspension of the sperm cells whose motility is to be measured. The specimen holder is more particularly illustrated in FIG. 2 wherein it will be seen that it includes a pair of transparent (e.g. glass) plates or slides 2a, 2b, separated by a plurality of small plastic beads 2c. The sperm sample to be examined, which is in the form of a diluted or undiluted suspension, is disposed in the spaces between the beads 2c. The beads are of a very small diameter, up to about 100 microns, so that the suspension is supported as a very thin film, between the two transparent plates 2a, 2b. As one example, the beads may be of polystyrene and of 100 microns (0.1 mm) in diameter.

The apparatus illustrated in FIG. 1 further includes a source of light for directing a light beam into the suspension within holder 2. Light source 4 is located so as to direct the light beam at a small angle, up to about 30°, into the suspension within the holder.

The movement of the sperm within the suspension in holder 2 produce light flashes by reflection. These light flashes are detected, via an optical magnifier 6, by an optical detector 8. Both the optical magnifier 6 (e.g., a microscope), and the optical detector 8 (e.g. a photocell or photo-multiplier), are disposed at an angle of substantially 90° to the specimen holder 2, as shown in FIG. 1.

Optical detector 8 outputs an electrical signal having an AC component corresponding to the light flashes or reflections produced by the movement of the sperm being examined in holder 2. This output electrical signal is fed to an AC amplifier 10 which amplifies only the AC component. The output of amplifier 10 is fed to a data processor 12 which counts the number of peaks in the output signal per unit time. Thus, by amplifying only the AC component of the electrical signal from detector 8, amplifier 10 amplifies only the varying portion of the output signal produced by the movement of sperm cells, and substantially ignores the non-varying background light reflected from the specimen in holder 2. This information is fed to a display unit 14 and also to an audio signalling unit 16.

Data processor 12 may be provided with means enabling the unit time to be preset, so that the detected number of reflections per unit time provides an index of motility of the sperm examined in holder 2. The display unit 14 may display this information in digital form or in analog form, as desired. Signalling device 16 may be used for providing an audio signal having a pitch corresponding to the detected number of reflections per unit time.

As one example, the specimen suspension within holder 2 may be undiluted and supported as a thin film of 100 microns (0.1 mm) thickness. This may be conveniently done by mixing the beads 2c (FIG. 2) in the specimen, coating the mixture on one glass plate 2a, and then applying the second glass plate thereover so that it is spaced from the first glass plate by the beads with the test suspension disposed as a thin film between the spacer beads. The optical magnifier 6 may have a magnification of 100, a field size of 1.2 mm (diameter), and an angle of 90° to the thin film, the angle of the light source being 8° to the thin film within holder 2. In such an example, a count of 60,000 per minute would indicate a healthy specimen.

While the invention has been described with respect to one preferred embodiment, it will be appreciated that many modifications, variations and other applications of the invention may be made.

What is claimed is:

1. A method of measuring sperm motility comprising: directing a beam of light into a suspension of the sperm; optically detecting reflections of the light from the sperm in the suspension; and counting by a detector the number of reflections per unit time to provide an index of sperm motility with respect to the sperm in said suspension, said suspension being supported as a relatively thin film, and said beam of light being directed into said thin film at an angle of less than 30° thereto from the same side as said detector.

2. The method according to claim 1, wherein said thin film is up to 100 microns in thickness.

3. The method according to claim 1, wherein said detector is located at substantially 90° to the plane of said thin film.

4. Apparatus for measuring sperm motility comprising: a holder for a suspension of the sperm whose motility is to be measured; means for directing a beam of light into the suspension of sperm in said holder; an optical detector for detecting reflections of the light from the sperm in said suspension; and counting means for counting the number of reflections per unit time to provide an index of sperm motility with respect to the sperm in said suspension, said holder being adapted to hold the sperm suspension in the form of a relatively thin film, said light directing means being disposed to direct the light at an angle of less than 30° to the surface of said thin film from the same side as said detector.

5. Apparatus according to claim 4, wherein said optical detector is located at substantially 90° to the thin film in said holder.

6. Apparatus according to claim 4, wherein said holder includes a pair of transparent plates separated by a plurality of small spacer beads, the sperm suspension being disposed in the spaces between said beads.

7. Apparatus according to claim 6, wherein said beads are of plastic and up to 100 microns in diameter.

8. Apparatus according to claim 4, further including an optical magnifier between said detector and said sperm-suspension holder.

9. Apparatus according to claim 4, wherein said optical detector outputs an electrical signal having an AC component corresponding to the number of reflections detected thereby, said counting means including an AC amplifier for amplifying only said AC component of the detector output.

10. Apparatus according to claim 4, further including a display unit for producing a display corresponding to the number of reflections counted per unit time by said counting means.

* * * * *